United States Patent [19]
Allouche et al.
[11] Patent Number: 4,580,463
[45] Date of Patent: Apr. 8, 1986

[54] WINCH FOR VARIOUS SHUTTERS USED FOR EVACUATION OF SMOKE AND VENTILATION PURPOSES

[75] Inventors: Claude J. J. Allouche, Acheres; Claude Le Métais, Bordeaux, both of France

[73] Assignee: Etablissements Dageville, France

[21] Appl. No.: 547,434

[22] Filed: Nov. 1, 1983

[30] Foreign Application Priority Data

Nov. 2, 1982 [FR] France ........................ 82 18317

[51] Int. Cl.[4] ........................ F16H 1/00
[52] U.S. Cl. ........................ 74/625; 160/310; 160/319
[58] Field of Search ........................ 74/411.5, 507, 625; 192/4 R, 9; 160/300, 303, 310, 319

[56] References Cited

U.S. PATENT DOCUMENTS 1,380,111 5/1921 Marsh ........................ 74/625 X
1,830,405 11/1931 Ohno ........................ 74/625 X
3,093,011 6/1963 Tuhro ........................ 74/625
3,580,321 5/1971 Root ........................ 160/310 X

*Primary Examiner*—Stephen F. Husar
*Attorney, Agent, or Firm*—Hauke and Patalidis

[57] ABSTRACT

A winch operating a drum around which a control cable is wound, the control cable controlling the opening and closing of shutters and smoke exhaust vents. The drum is driven by a gear train which may be immobilized by an electromagnetic brake or lock, such that the shutters or vents may be held closed or open, or in any intermediary position. In addition, the drum is provided with a ratchet wheel which can be immobilized by a solenoid operated rod. The electromagnetic brake or lock and the solenoid operating the ratchet wheel rod are controlled by push-buttons, and an emergency control is provided for releasing simultaneously the ratchet wheel and the electromagnetic brake or lock, such as to operate the drum for instantaneously opening the shutters and air vents to evacuate smoke and gases from the building.

4 Claims, 3 Drawing Figures

WINCH FOR VARIOUS SHUTTERS USED FOR EVACUATION OF SMOKE AND VENTILATION PURPOSES

BACKGROUND OF THE INVENTION

It is already known to use winches for manually or automatically opening any type of shutters placed on roofs or on facades of buildings for the evacuation of smoke or for ventilation purposes, these shutters being particularly provided at the top of staircases, elevator wells and ducts of any sort which are found in domestic, commercial or industrial buildings. The shutters permit, when closed, to protect the staircases and other ducts against bad weather, and, when open, to ventilate the premises, especially when the weather is hot.

Moreover, these shutters or smoke outlets should open instantaneously in case of a discharge of smoke or noxious gases in order to avoid their spreading throughout the building.

The smoke outlets are provided with spring devices tending to open them, and they are kept closed by means of a releasable locking mechanism, such as a mechanical or electromagnetic lock, a thermal fuse or the winch operating the smoke outlets for ventilation purposes.

But all such mechanisms do not accomplish all the functions required by the new safety regulations.

The present invention remedies this disadvantage by providing a winch which can be operated manually or with the aid of a small motor, the winch having a drum on which is wound the control cable of the smoke outlet, and which is subjected to the control of radial electromagnetic release means having multiple blocking positions providing an immediate response for an instantaneous automatic opening of the smoke exhaust outlets or vents.

SUMMARY OF THE INVENTION

According to the invention, the winch for the smoke outlet comprises a cabinet or enclosure of a rectangular parallelepiped shape, in which is mounted a casing containing a shaft for rotation of a drum around which is wound a cable for controlling the opening and closing of the shutter, this drum being connected by a train of pinions to an actuation member in the form, for example, of a crank; moreover, one of the pinions can be blocked by radial electromagnetic release means with multiple blocking positions, the electrical supply of which is controlled by a control circuit comprising two switches and a fist-operated switch, and the drum is also blocked via a ratchet wheel cooperating with a catch including a rod operated by an electromagnet controlled by one of the two switches and by the fist-operated switch through a contactor or relay.

According to another feature of the invention, an electric motor is provided for rotating the drum in order to rewind the cable of the smoke outlet, said electric motor being supplied under control of an electric circuit independent of the control circuit of the radial electromagnetic release means.

Various other features of the invention will become more apparent from the reading of the following detailed description.

BRIEF DESCRIPTION OF THE DRAWINGS

Embodiments of the invention are shown by way of non limitative examples in the accompanying drawings in which.

DESCRIPTION OF THE PREFERRED EMBODIMENT

Figure 2:
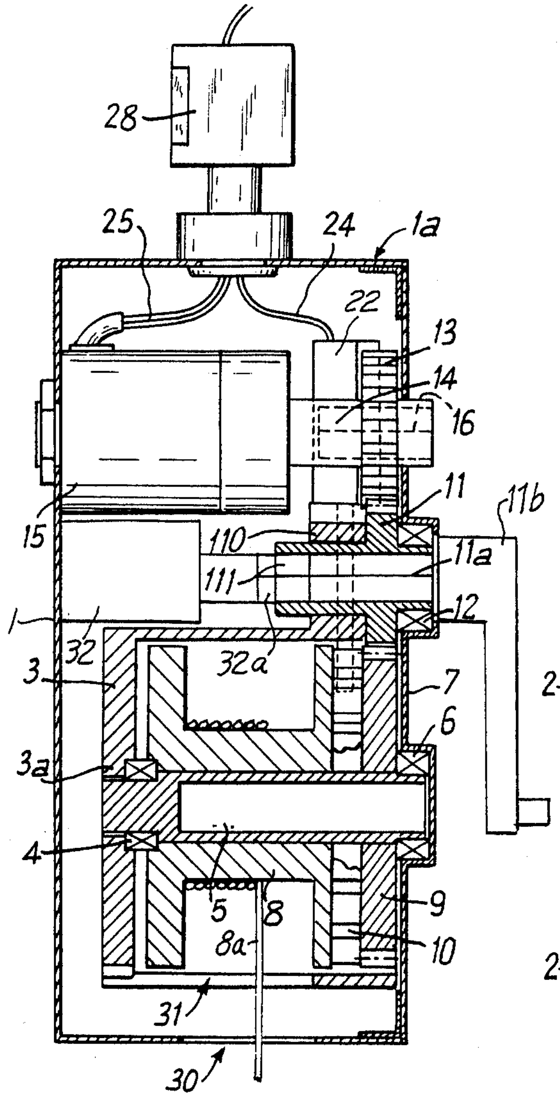
FIG. 2 is a cross section view taken along line II—II of FIG. 1.
Figure 1:
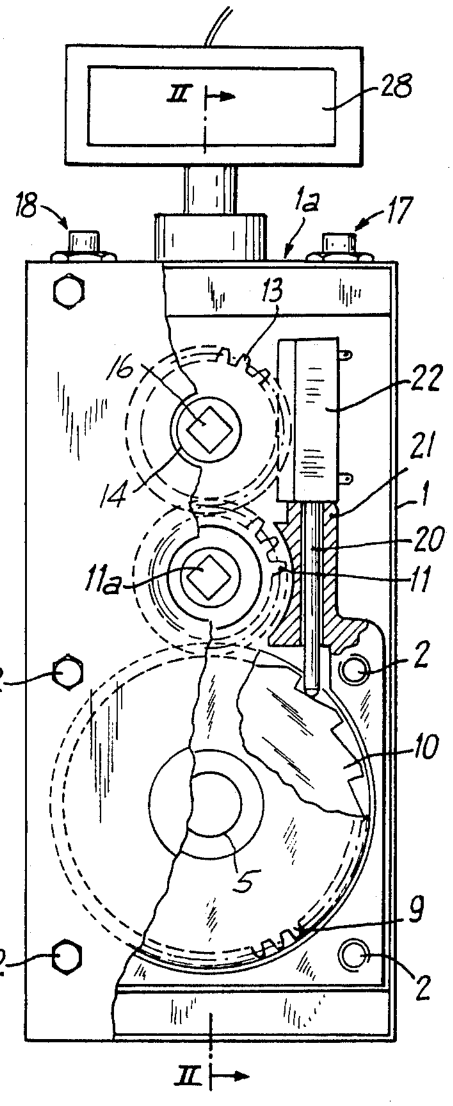
FIG. 1 is a partially broken and cut away front view of a winch for controlling a smoke exhaust outlet according to the invention.

As illustrated at FIG. 1, a winch used for actuating a smoke exhaust outlet is formed of a cabinet or enclosure 1 having a rectangular parallelepiped shape, and in which is mounted by means of screws or bolts 2 a casing 3 including in one side 3*a* a bearing 4 rotatably supporting a shaft 5. The front portion of the shaft 5 rotates in a bearing 6 fixed in a cover 7 of the cabinet or enclosure 1, the cover 7 being also maintained by the screws or bolts 2.

The shaft 5 supports a drum 8 which can rotate with the shaft 5.

A pinion 9 rigidly connected to the drum 8 and to the shaft 5 co-acts with a ratchet wheel 10 to which it is operatively connected.

Above the pinion 9 and meshing therewith there is mounted a pinion 11 integral with a shaft 111 rotatably supported by a bearing member 110 in the cover 7 of the casing 3 at one of its ends, and by a ball-bearing 12 at its other end.

Finally, the pinion 11 meshes with a pinion 13 mounted on a shaft 14 of a radial electromagnetic locking and release means 15.

The shaft 14 of the locking and release means 15 has an outer end provided with a square socket 16 which projects through the cover 7.

The top 1*a* of the cabinet or enclosure 1 carries two push-buttons 17, 18 for the control of switches.

As can be seen in FIG. 1, the ratchet wheel 10 co-acts with a rod 20 which forms a governor weight. The rod 20 is guided in a housing 21 fixed to the cabinet 1 and having at its upper portion an electromagnet 22 the winding of which is operative to lift the rod 20 since the rod 20 ends into an electromagnetic armature (not shown) included in the electromagnet 22.

Electrical power is supplied to the electromagnet 22 as well as to the electromagnetic locking and release means 15 through conductors 24, 25 via the switches controlled by the push-buttons 17, 18 and by an override fist-operated device 28.

The end of a cable 8*a* controlling the opening and closing of the smoke exhaust outlet is attached to the drum 8, this cable extending through an opening 30 formed in the cabinet 1 and an opening 31 formed in the casing 3. Return pulleys (not shown) are provided for correctly guiding the cable.

Figure 3:
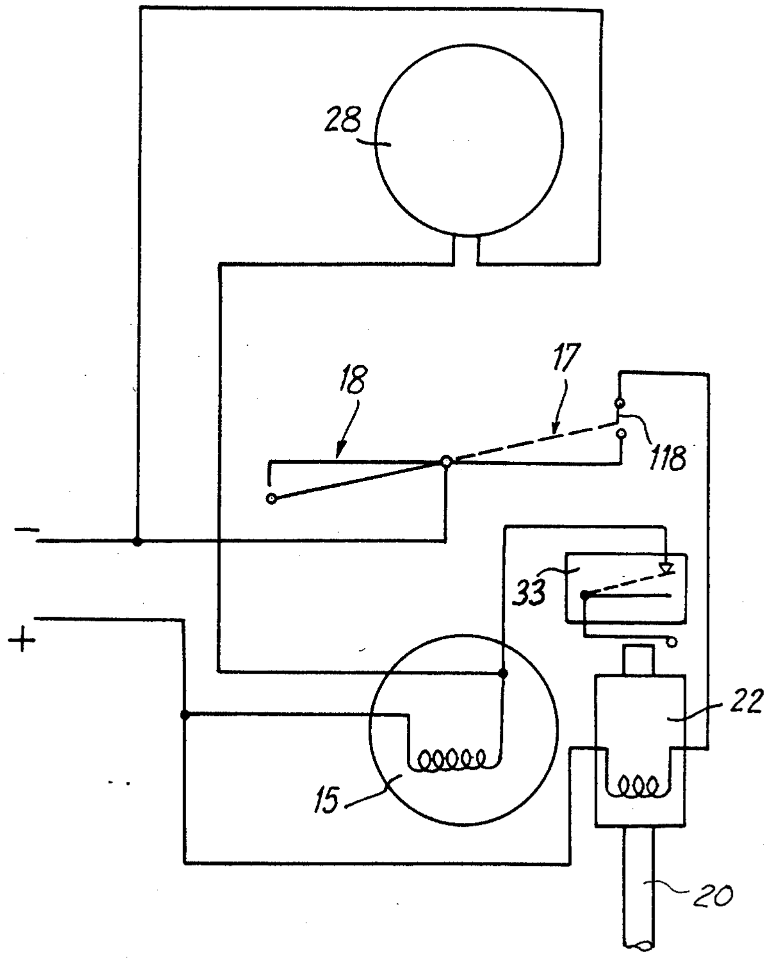
FIG. 3 is an electrical circuit diagramm for explaining the connection of the winch.

As is shown in the electrical schematic of FIG. 3, when the push-button 17 is pressed, electrical supply to the electromagnet 22 is cut off. Thus, the rod 20 moves downwardly to the position shown in FIG. 1 on the ratchet wheel 10, but the rod 20 is free in its movements.

Simultaneously, a contactor or relay 33 opens and cuts off the supply of electrical current to the radial electromagnetic release means 15. At that moment, the drum 8 is free since the pinion 13 can rotate freely, and the cable can be then either unwound from or rewound on the drum 8 in order to open or close the smoke outlet.

For manual control, a crank 11*b* is mounted on the end of the shaft 111 of the pinion 11, the pinion shaft 111 having a square opening or socket 11*a* for receiving the end of the crank. The crank can also be coupled to the socket 16 of the shaft 14 of the pinion 13.

The crank can be replaced by an independently controlled electric motor, if so desired. In this case, the electric motor, as shown at 32 at FIG. 1, is suitably disposed inside the cabinet or enclosure 1 and the shaft 32*a* of the electric motor is coupled to the other end of the shaft 111 of the pinion 11.

When the cable is rewound on the drum 8 and if the push-button 18 is pressed, a switch 118 (FIG. 3) is closed and the electromagnet 22 is therefore activated. The rod 20 is raised, and the ratchet wheel 10 is thus disengaged but, at the same time, the radial electromagnetic locking and release means 15 is activated such as to lock the pinion 13 and the pinions 11 and 9.

The drum 8 is therefore locked and the cable is maintained in its wound state.

When, for some reason, it is required to open instantaneously the smoke outlet, the glass protecting the over-ride fist operated device 28 is broken by punching it with the fist, for example, the effect of which is to open the supply circuit of the radial electromagnetic locking and release means 15, and therefore to free the transmission through the pinions 13, 11 and 9, which also frees the drum 8. An instantaneous opening of the smoke outlet is therefore possible since the cable unwinds freely from the drum 8.

The premises, staircases, elevator wells and other ducts are also placed instantaneously in communication with the open air.

It should be noted that the radial electromagnetic locking and release means 15 is designed such as to permit its locking and unlocking in all positions intermediate between a closed position and a totally opened position of the smoke outlet, thereby limiting the opening of the smoke outlet and also rewinding the cable at any moment for a quick closing of the smoke outlet. The radial electromagnetic release means 15, having multiple positions, permits a modulated ventilation of the premises in which are mounted the various shutters currently used in buildings.

In some installations the rod 20 can be replaced by an equivalent locking member such as a catch or other locking means.

Having fully described my invention and wishing to cover those modifications and variations which would be apparent to those skilled in the art without departing from either the scope or spirit thereof,

What is claimed is:

1. A winch for a control cable operating smoke evacuation and ventilation shutters and ducts in a building, said winch comprising an enclosure, a casing mounted in said enclosure, a drum rotatably supported in said casing for winding of said control cable therearound, a gear train for driving said drum in rotation, said gear train comprising a first pinion for driving said drum and a second pinion, power drive means coupled to said first pinion, electromagnetically operated locking means coupled to said second pinion, a ratchet wheel attached to said drum, a solenoid actuated rod engageable with said ratchet wheel, manual switch means for selectively energizing and de-energizing said electromagnetic locking means and said solenoid actuated rod for selectively locking said drum against rotation and allowing said drum to rotate, an over-ride emergency switch means for simultaneously energizing said solenoid actuated rod and de-energizing said electromagnetically operated locking means.

2. The winch of claim 1 wherein said first pinion is driven by a crank.

3. The winch of claim 1 wherein said first pinion is driven by an electric motor.

4. The winch of claim 1 wherein said first pinion is drivable by a crank.

* * * * *